US 11,070,658 B2

(12) United States Patent
Gray et al.

(10) Patent No.: US 11,070,658 B2
(45) Date of Patent: *Jul. 20, 2021

(54) ZERO TOUCH PROVISIONING

(71) Applicant: Aruba Networks, Inc., Sunnyvale, CA (US)

(72) Inventors: Gordon Paul Gray, Menlo Park, CA (US); Anthony Burke, Frisco, TX (US); David Munro, San Jose, CA (US); Yan Liu, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 390 days.

This patent is subject to a terminal disclaimer.

(21) Appl. No.: 15/138,664

(22) Filed: Apr. 26, 2016

(65) Prior Publication Data
US 2016/0241442 A1 Aug. 18, 2016

Related U.S. Application Data

(63) Continuation of application No. 13/829,065, filed on Mar. 14, 2013, now Pat. No. 9,325,575.

(60) Provisional application No. 61/720,868, filed on Oct. 31, 2012.

(51) Int. Cl.
G06F 15/16 (2006.01)
H04M 1/72409 (2021.01)
H04L 12/24 (2006.01)
H04M 1/72406 (2021.01)
(Continued)

(52) U.S. Cl.
CPC .... H04M 1/72409 (2021.01); H04L 41/0806 (2013.01); H04L 41/0846 (2013.01); H04L 61/6022 (2013.01); H04L 61/6081 (2013.01); H04L 67/10 (2013.01); H04L 67/26 (2013.01); H04M 1/72406 (2021.01); H04L 41/00 (2013.01)

(58) Field of Classification Search
CPC .................................................. H04L 41/0806
See application file for complete search history.

(56) References Cited

U.S. PATENT DOCUMENTS 6,199,204 B1  3/2001  Donohue
6,510,466 B1  1/2003  Cox et al.
7,050,946 B2  5/2006  Delegue et al.
(Continued)

FOREIGN PATENT DOCUMENTS

CN      105071959      11/2015

OTHER PUBLICATIONS

Daniel Nurmi et al., "The Eucalyptus Open-source Cloud-computing System," 9th IEEE/ACM International Symposium on Cluster Computing and the Grid, 2009, pp. 124-131, IEEE.
(Continued)

Primary Examiner — Kevin T Bates
Assistant Examiner — Clarence D McCray

(57) ABSTRACT

According to one embodiment, a method comprises automatically uploading device information from a first network device in a first operating state to a second network device in response to an event, such as an initial power up. The second network device is part of the cloud, and thus, providing cloud-based services. Subsequent to the uploading of the device information, the first network device receives information controlling the operation of the first network device based on the device information.

17 Claims, 11 Drawing Sheets

(51) Int. Cl.
    *H04L 29/12* (2006.01)
    *H04L 29/08* (2006.01)

(56) References Cited

U.S. PATENT DOCUMENTS

| | | | |
|---|---|---|---|
| 7,069,293 | B2 | 6/2006 | Cox et al. |
| 7,130,897 | B2 | 10/2006 | Dervin et al. |
| 7,146,412 | B2 | 12/2006 | Tumbull |
| 8,341,250 | B2 | 12/2012 | Pritikin et al. |
| 8,489,834 | B1 | 7/2013 | Kumbhari |
| 8,640,198 | B2 | 1/2014 | Raleigh |
| 8,887,144 | B1 | 11/2014 | Marr et al. |
| 9,130,837 | B2 | 9/2015 | Biarnason et al. |
| 9,325,575 | B2 | 4/2016 | Gray et al. |
| 9,973,467 | B2 | 5/2018 | Dhulipala et al. |
| 2006/0174319 | A1 | 8/2006 | Kraemer et al. |
| 2006/0280183 | A1 | 12/2006 | Chen et al. |
| 2008/0049644 | A1 | 2/2008 | Halbert |
| 2009/0132682 | A1* | 5/2009 | Counterman ........... H04L 63/08 709/220 |
| 2010/0306352 | A1* | 12/2010 | Pritikin ............... H04L 41/0806 709/221 |
| 2010/0306354 | A1 | 12/2010 | DeHaan et al. |
| 2011/0289200 | A1 | 11/2011 | Patil et al. |
| 2012/0016915 | A1 | 1/2012 | Choi et al. |
| 2012/0254119 | A1 | 10/2012 | Kumarasamy et al. |
| 2012/0303696 | A1* | 11/2012 | Kim ........................ H04L 67/38 709/203 |
| 2013/0031224 | A1* | 1/2013 | Nachtrab ............ H04L 67/2804 709/220 |
| 2013/0054763 | A1* | 2/2013 | Van der Merwe ...... H04W 8/12 709/220 |
| 2013/0173900 | A1 | 7/2013 | Liu |
| 2013/0211546 | A1 | 8/2013 | Lawson et al. |
| 2013/0232497 | A1* | 9/2013 | Jalagam ................ G06F 9/5072 718/104 |
| 2013/0262390 | A1* | 10/2013 | Kumarasamy ...... H04L 41/0846 707/649 |
| 2014/0032920 | A1* | 1/2014 | Gehrmann ............ H04L 9/0822 713/176 |
| 2014/0047342 | A1 | 2/2014 | Breternitz et al. |
| 2014/0049365 | A1 | 2/2014 | Ahearn et al. |
| 2014/0280940 | A1* | 9/2014 | Chapman ................ H04L 41/50 709/225 |
| 2014/0379536 | A1 | 12/2014 | Varma et al. |
| 2015/0009861 | A1 | 1/2015 | Balazs |
| 2018/0083830 | A1 | 3/2018 | Pendleton et al. |

OTHER PUBLICATIONS

M. Dikaiakos and G. Pallis, "Cloud Computing: Distributed Internet Computing for IT and Scientific Research," Sep./Oct. 2009, pp. 10-13, IEEE Computer Society.
Michael Armbrust et al., "A View of Cloud Computing," Communications of the ACM, Apr. 2010, pp. 50-58, vol. 53, No. 4, ACM.
Froehlich, A., The On-premises Vs. Cloud-managed WLAN Architecture Debate, (Web Page), Retrieved Mar. 26, 2019, 8 Pgs.
Winstanley, P., Implementing Windows Autopilot—The Future of Device Deployment, (Web Page), Retrieved Mar. 26, 2019, 32 Pgs.
"Elasticsearch-dump", taskrabbit, available online at <https://web.archive.org/web/20170227213250/https://github.com/taskrabbit/elasticsearch-dump>, Feb. 27, 2017, 7 pages.
"Cassandradump", available online at <https://web.archive.org/web/20150703063319/https://github.com/gianlucaborello/cassandradump>, Jul. 3, 2015, 3 pages.

* cited by examiner

FIG. 7

| Distribution by FW Family (7) | | |
|---|---|---|
| Unknown: | 1,805 | 3.68% |
| Special: | 1,976 | 4.03% |
| F1: | 11,759 | 23.98% |
| F2: | 2,998 | 6.11% |
| F3: | 1,742 | 3.55% |
| F4: | 20,940 | 42.7% |
| F5: | 7,818 | 15.94% |
| Total: | 49,038 | 100% |

| Distribution by Mode (3) | | |
|---|---|---|
| IAP-SUB: | 25,985 | 52.99% |
| IAP-VC: | 21,456 | 43.75% |
| RAP: | 1,597 | 3.26% |
| Total: | 49,038 | 100% |

| Distribution by OEM (3) | | |
|---|---|---|
| OEM 1: | 44,713 | 91.19% |
| OEM 2: | 2,422 | 4.94% |
| OEM 3: | 1,897 | 3.87% |
| Total: | 49,032 | 100% |

| Distribution by Part Family (7) | | |
|---|---|---|
| AP-1: | 30,521 | 62.24% |
| AP-2: | 13,370 | 27.26% |
| RAP-3: | 3,328 | 6.79% |
| AP-3: | 1,743 | 3.55% |
| AP-4: | 56 | 0.11% |
| RAP-2: | 19 | 0.04% |
| AP-5: | 1 | 0% |
| Total: | 49,038 | 100% |

| Distribution by Country (109) | | |
|---|---|---|
| United States: | 5299 | 52.99% |
| United Kingdom: | 554 | 5.54% |
| Canada: | 346 | 3.46% |
| China: | 334 | 3.34% |
| France: | 255 | 2.55% |
| Korea, Republic of: | 243 | 2.43% |
| India: | 227 | 2.27% |
| Japan: | 217 | 2.17% |
| Spain: | 210 | 2.1% |
| Australia: | 201 | 2.01% |
| Italy: | 189 | 1.89% |
| Norway: | 157 | 1.57% |
| Netherlands: | 149 | 1.49% |
| Germany: | 108 | 1.08% |
| Hong Kong: | 107 | 1.07% |
| Switzerland: | 105 | 1.05% |
| United Arab Emirates: | 90 | 0.9% |
| Sweden: | 84 | 0.84% |
| Singapore: | 84 | 0.84% |
| New Zealand: | 61 | 0.61% |
| Denmark: | 60 | 0.6% |

| Distribution by Cluster Count (54) | | |
|---|---|---|
| 1-AP: | 7132 | 71.32% |
| 2-APs: | 1091 | 10.91% |
| 3-APs: | 544 | 5.44% |
| 4-APs: | 337 | 3.37% |
| 5-APs: | 176 | 1.76% |
| 6-APs: | 152 | 1.56% |
| 7-APs: | 90 | 0.9% |
| 8-APs: | 83 | 0.83% |
| 9-APs: | 63 | 0.63% |
| 10-APs: | 56 | 0.56% |
| 12-APs: | 41 | 0.41% |
| 11-APs: | 4 | 0.4% |
| 13-APs: | 38 | 0.38% |
| 15-APs: | 31 | 0.31% |
| 14-APs: | 27 | 0.27% |
| 16-APs: | 24 | 0.24% |
| 18-APs: | 6 | 0.06% |
| 17-APs: | 6 | 0.06% |
| 23-APs: | 5 | 0.05% |
| 22-APs: | 5 | 0.05% |
| 19-APs: | 5 | 0.05% |

ZERO TOUCH PROVISIONING

CROSS-REFERENCE TO RELATED APPLICATIONS

This application claims the benefit of priority on U.S. Provisional Application No. 61/720,868 filed Oct. 31, 2012, the entire contents of which are incorporated by reference.

FIELD

Embodiments of the disclosure relate to the field of communications, and in particular, to a system and method directed to "zero-touch" provisioning of network devices.

GENERAL BACKGROUND

Over the last decade or so, access points were provisioned by network service providers. In particular, according to a first conventional deployment scenario, network device manufacturers/vendors are responsible for providing access points to a network service provider. The network service provider provisions the access points for a particular customer by configuring each access point with particular settings desired by the customer (e.g. encryption type, power levels, name, etc.). Thereafter, the access point is re-labeled and re-shipped to that customer for deployment. This provisioning scheme is costly and, in some cases, substantially delays deployment of needed wireless networking equipments.

Another conventional deployment scenario involves a corporation having a dedicated facility for configuring access points. Access points are sent from a network device manufacturer/vendor to the facility. After configuring at the facility, the access point intended for use by a remote employee of the corporation is sent from the facility for subsequent deployment by the employee. As before, this provisioning scheme is costly due to additional shipping and labor costs.

Yet another conventional deployment scenario involves a corporation re-shipping an "unprovisioned" access point received from a network device manufacturer/vendor to an employee along with instructions as to how to provision and configure the access point. This deployment scenario is costly from a loss of labor perspective as the employee is required to allocate time from work for such deployment.

BRIEF DESCRIPTION OF THE DRAWINGS

The invention may best be understood by referring to the following description and accompanying drawings that are used to illustrate embodiments of the disclosure.

FIG. 7 is an exemplary embodiment of a dashboard produced by the cloud-based service and accessible for monitoring network devices ordered and/or deployed within the customer's wireless local area network.

DETAILED DESCRIPTION

Figure 1:
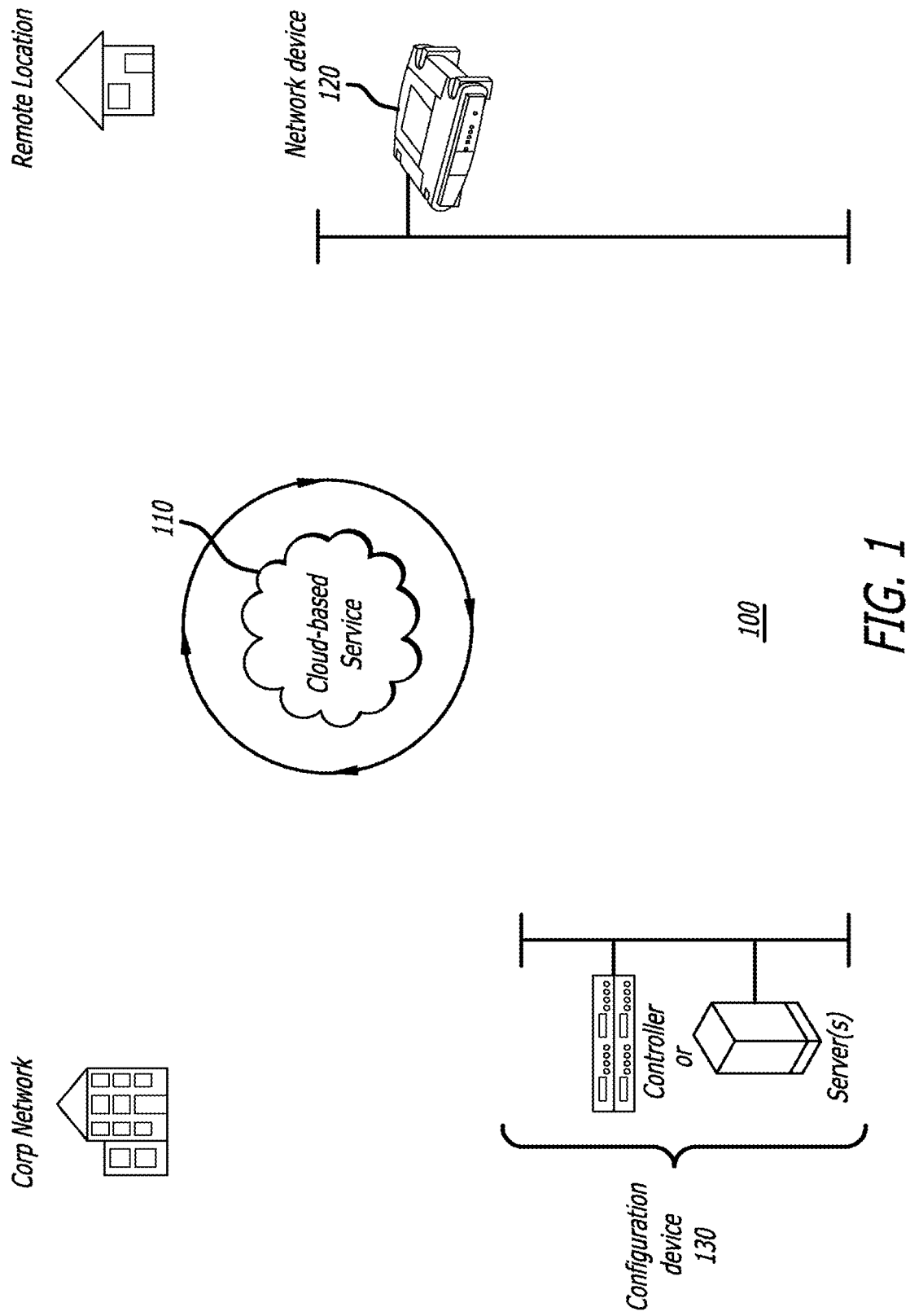
FIG. 1 is an exemplary embodiment of a wireless network utilizing a cloud-based, zero-touch provisioning scheme.

Embodiments of the disclosure are directed to a cloud-based service that is adapted for "zero-touch" provisioning of network devices and inventory management. This "zero-touch provisioning" eliminates the need for technical support personnel to visit an installation site to provision a network device, avoids re-shipment of network devices after provisioning, and optimizes use of resources. This provisioning scheme enables wireless local area networks (WLANs) to be deployed at unprecedented speed and without onsite Information Technology (IT) support at any number of locations worldwide.

Typically, the entire configuration process takes less than 10 minutes to complete—from initial power-on of the network device until complete configuration and deployment on the WLAN. This cloud-based service significantly slashes deployment time of various groups of network devices (e.g., independent APs "IAPs", remote APs "RAPs", etc.). It also significantly reduces the total cost of enterprise WLAN ownership.

In general, a newly-ordered network device is automatically added to the customer's inventory in a cloud-based service, such as Aruba® Activate™ for example, and is associated with proper provisioning rules for that customer. Such association may be accomplished by placing device information for that particular network device into a folder associated with a desired set of rules to be followed. The network device in a first operating (non-provisioned) state is then factory-shipped to a targeted destination, where a non-technical person takes the network device out of the box and an event occurs (e.g., power-up and connection to a network; connection to a network; time-based in which a prescribed amount of time has elapsed; or return back to the first operating state). In a "non-provisioned state," the network device has no configuration settings and has no knowledge of a network device that is operating as its configuration device (e.g., network management server such as AirWave® or a controller such as ARUBA® 6000, 7200 or 3x000 controllers). In contrast, in another operating (provisioned) state, the network device is provided with rules that define how the device may contact its configuration device to retrieve information, such as firmware and configuration settings and in what configuration group the network device belongs. Furthermore, the rules may be used to automatically assign the network device to specific geographical locations.

Upon connection, the network device in the non-provisioned state retrieves its provisioning information from the cloud-based service and then uses that information to obtain its configuration information from another network device operating as a configuration device. Depending on the mode of operation, such as where the network device is operating as a virtual control device, the network device may then push that configuration out to one or more other subordinate network devices in the WLAN.

According to one embodiment of the disclosure, the network device provisioning workflow follows a three-step process:

Step 1: Create Locations and Define Provisioning Rules

An administrator can log into the cloud-based service to find the list of network devices purchased by a particular organization. To assign network devices to a specific configuration device (e.g. one or more network management servers or one or more controllers), different folders with rules identifying an Internet Protocol (IP) address for different configuration devices may be formulated so that network devices can be grouped based on their geographic location. Other groupings of network devices may be utilized by a particular customer (e.g., organization, company or subsidiary, department, etc.) to realize different rules based on firmware types; modes of operation; original equipment manufacturer (OEM); device types or families; geographic locations; part numbers; shipping manifests and/or customer purchase orders; etc.

Besides providing a framework for auto-provisioning, this folder hierarchy also provides a means for load balancing. For example, the cloud-based service can provide geo-load balancing capability to route traffic in and out of the closest geographic region as defined by cloud host provider.

The cloud-based service may also leverage the load balancing function by the cloud host provider to distribute traffic evenly across plurality of application servers per region. Also, the regional application server allocations can ensure that network devices downloading firmware images will utilize the most efficient route.

Provisioning rules applicable to a folder/group of network devices provide a defined protocol as to how the network devices can contact their configuration device to retrieve firmware and configuration settings. The provisioning rules can also be used to automatically assign the network devices to specific locations. Notification rules can be set up to notify the administrator of the status of the network devices, e.g., via email notifications.

Step 2: Select Devices

The cloud-based service allows for sorting and filtering of all network devices in an assigned device list, making it easy to display the network devices assigned to any defined folder.

Step 3: Assign Devices to Folders

The cloud-based service makes it easy to assign one or multiple network devices to a folder by highlighting the network device and using a "move-to-folder" function. When network devices are moved into a folder, they immediately inherit all the rules defined for that folder upon requesting provisioning after detection that the network device is in a prescribed setting (e.g. factory default setting) at power on.

More specifically, according to one embodiment of the invention, the network device is placed into a prescribed setting so that, when the network device is powered on, it is configured to establish communications with a cloud-based service. During such communications, information is uploaded to the cloud-based service, namely one or more of the following: (1) Media Access Control (MAC) address for the network device; (2) serial number for the network device; and/or (3) type of the network device. Thereafter, validation of the network device may be performed, perhaps using a challenge/response protocol soliciting a signed certificate from a trusted platform module (TPM) deployed within the network device.

Upon receipt of this information and optional successful validation, the cloud-based service provides provisioning information back to the network device. In general, the provisioning information is sufficient for the network device to establish communications with a configuration device, such as one or more management servers or master controllers for example, to acquire at least configuration setting information.

According to one embodiment of the invention, the provisioning information may include (i) an Internet Protocol (IP) address of a particular server, (ii) keying information (e.g., shared secrets, namely information at least partially used as a key or for key generation), and/or (iii) an organization name. According to another embodiment of the invention, the cloud-based service provides provisioning information such as an Internet Protocol (IP) address and/or a Domain Name System (DNS) name associated with the configuration device to which the network device is to connect for configuration.

Thereafter, after the network device establishes communications with a particular configuration device (e.g. network management server or controller), the configuration device is adapted to push configuration setting information to the network device. The configuration setting information may include security policy, Service Set Identifier (SSID), routing policy, shared secrets for cryptographic operations, transmit power levels, wireless channels being utilized, etc.

Herein, certain terminology is used to describe features of the disclosure. For example, the term "network device" generally represents electronics that support the receipt and/or transmission of wireless communications including, but not limited or restricted to an access point (AP); a base station; a server; a data transfer device (e.g., switch, router, bridge, brouter, controller, etc.); consumer electronics with wireless connectivity such as a television, a set-top box, a video gaming console, a projector, and/or a television peripheral such as Apple® TV; a communication management device; or the like.

The functionality described herein may be performed by hardware, firmware or software. For instance, one or more software modules may be executable by one or more processors to obtain the provisioning information and using the provisioning information to obtain the configuration setting information. These software modules may include, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

An "interconnect" is generally defined as a communication pathway established over an information-carrying medium. This information-carrying medium may be a physical medium (e.g., electrical wire, optical fiber, cable, bus traces, etc.), a wireless medium (e.g., air in combination with wireless signaling technology) or a combination thereof. The data transferred over the interconnect may be in accordance with a variety of communication protocols including, but not limited or restricted to those protocols in accordance with WIFi™, various IEEE 802.11 standards (e.g., IEEE 802.11ac, 802.11n, etc.), or the like.

Lastly, the terms "or" and "and/or" as used herein are to be interpreted as inclusive or meaning any one or any combination. Therefore, "X, Y or Z" or "X, Y and/or Z" mean "any of the following: X; Y; Z; X and Y; X and Z; Y and Z; X, Y and Z." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations are not set forth in detail in order to avoid unnecessarily obscuring this description.

I. Zero-Touch Provisioning Network Architecture

Referring to FIG. 1, an exemplary embodiment of a network 100 utilizing a cloud-based, zero-touch provisioning scheme is shown. Herein, network 100 comprises a cloud-based service 110 that is adapted for receiving communications from a network device 120.

Herein, cloud-based service 110 comprises one or more servers that collectively operate to automate network device provisioning and inventory management though a folder-based provisioning system that may be organized into folders by organization, groups within the organization, product families or types, or the like. Each folder is associated with specific provisioning rules, In particular, cloud-based service 110 is configured to receive information associated with a network device for subsequent deployment (e.g., MAC address, serial number, or other information used to identify the network device) from manufacturers, vendors/resellers, customers and network administrators. This device information is placed as an entry of at least one folder to coordinate seamless configuration of network devices. Thereafter, upon receiving device information from network devices to initiate provisioning that matches the preloaded device information, cloud-based service 110 returns provisioning data associated with that particular folder to continue configuration of the network device. In addition, cloud-based service 110 also stores and downloads white lists that identify MAC addresses of valid network devices and maintains information exchanged during provisioning in order to provide inventory management for customers, manufacturers and vendors.

More specifically, a provider of cloud-based services 110 utilizes the service to assist customers in planning when devices are manufactured and the number of devices to be manufactured. According to one embodiment of the disclosure, network devices are requested in the database and device "status" is updated to "planned". One or more manufacturers securely sends daily updates to cloud-based service 110 on what network devices are manufactured each day. These updates may include (i) device manufacturing date, (ii) serial number, (iii) operating system (OS) version, and (iv) boot block version. After, the device status is updated to "manufactured."

Thereafter, vendors/resellers send more timely updates (e.g., hourly) on what network devices have been shipped and to which customer(s). The updates effectively assign a customer to a particular network device and a vendor/reseller to a device. A ship date for the network device is updated along with its status to indicate a "shipped" status.

Customers can auto-enable provisioning updates or update network devices individually to receive provisioning information from cloud-based service 110. When network device 120, operating in a non-provisioned state, communicates with cloud-based service 110 and receives provisioning information, the device status is changed to "provisioned". The device status is changed to "activated" once configuration is complete through communications with configuration device 130. The customer also has the ability to "retire" a device by indicating its removal from deployment.

Figure 2:
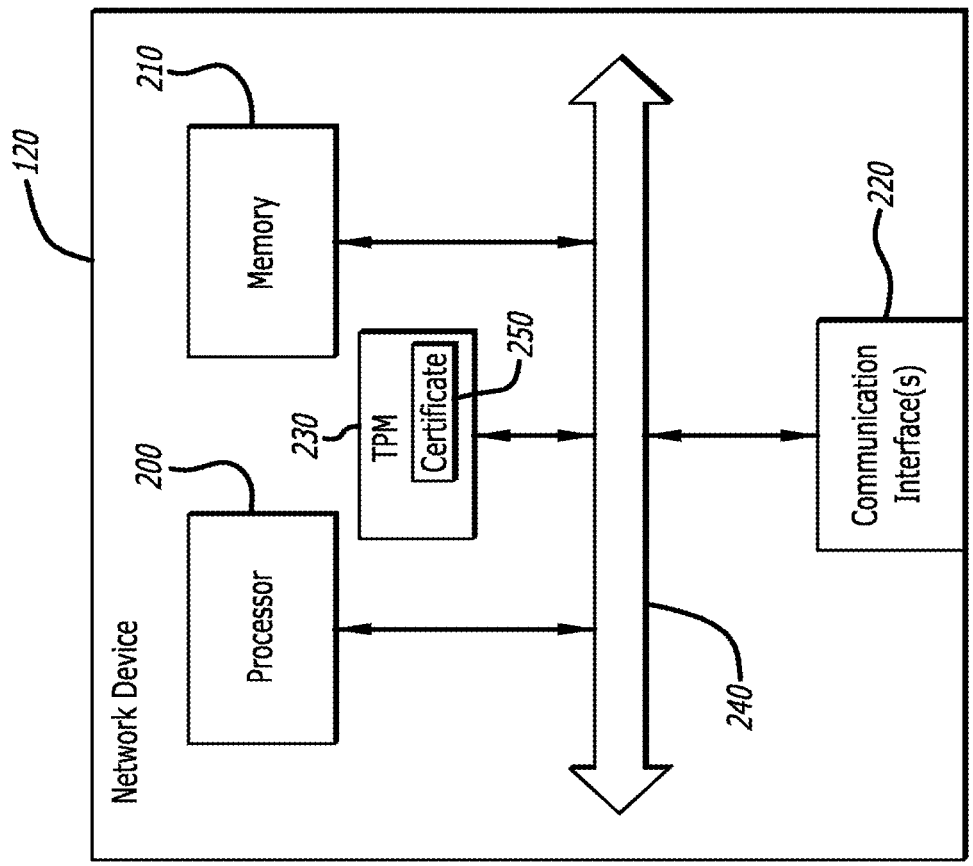
FIG. 2 is an embodiment of the network device.

Referring to FIG. 2, an exemplary embodiment of network device 120 operating in combination with cloud-based service 110 is shown. In accordance with one embodiment of the disclosure, network device 120 comprises one or more processors 200, a memory 210 and a communication interface 220 that is adapted to communicate with other devices supporting wired and/or wireless connectivity. For instance, memory 210 may be a type of non-volatile memory that may store firmware, device information and/or configuration setting information for network device 120, where the configuration setting information provides the configuration setting for network device. Communication interface 220 may comprise a wired port and/or one or more radios, tuners, and/or antenna(s) that support wireless communications.

Optionally, network device 120 may include a trusted platform module (TPM) 230 in communication with processor 200 and memory 210 over an interconnect 240. The TPM 230 comprises a digital certificate 250 including a serial number and/or MAC address of network device 120. Certificate 250 may be used to verify to cloud-based service 110 of FIG. 1 that a provisioning request is from a validated network device or verify that received communications are from validated cloud-based service 110.

II. "Zero-Touch" Provisioning Schemes

Figure 3:
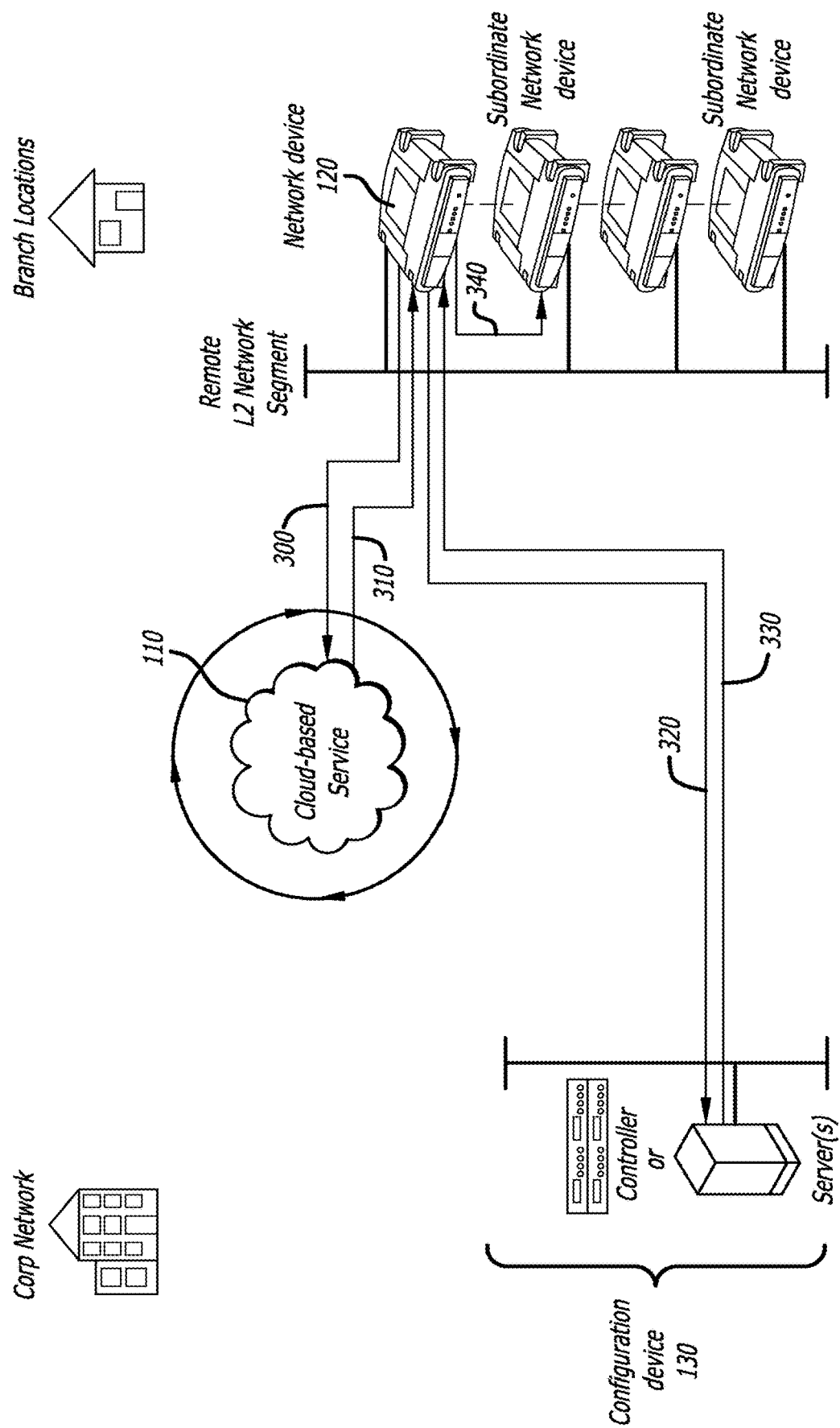
FIG. 3 is a first embodiment of the cloud-based, zero-touch provisioning scheme.

Referring to FIG. 3, a first embodiment of the cloud-based, zero-touch provisioning scheme is shown for provisioning network device 120 in accordance with a first operating mode (e.g., as controller independent AP "IAP", a controller, a switch, etc.). First, a newly-ordered, network device 120 is added, possibly by customer (Corp Network), to a customer inventory accessible by a cloud-based service 110 (operation 300). The addition of newly-ordered network device 120 to the customer inventory is designed to associate that device with provisioning rules associated with a device group (e.g., IAP, certain family or model of controller or switch, etc.) into which network device 120 is assigned.

Next, although not shown, network device 120 in a non-provisioned state is factory-shipped to its targeted destination. The end user powers on network device 120 where, if no prescribed activity is performed in network device 120 after a prescribed time has elapsed, network device 120 transmits device information to cloud-based service 110 (operation 310). The device information may include (1) a Media Access Control (MAC) address for network device 120; (2) a serial number for network device 120; and/or (3) a device type or destination for network device 120.

It is contemplated that, prior to transmitting device information to cloud-based service 110, network device 120 may perform other operations to determine if a configuration device 130, which is handling device configurations, is located on the same subnet as network device 120. This may be conducted through Open System Interconnect (OSI) Layer 2 (L2) Discovery operations. If not, network device 120 may also perform Dynamic Host Configuration Protocol (DHCP) or Domain Name System (DNS) operations to locate configuration device 130.

It is contemplated that validation of network device 120 may be performed in communications with cloud-based service 110 and/or configuration device 130. According to one embodiment of the disclosure, a challenge/response protocol may be utilized to solicit transmission of digital certificate 250 from a trusted platform module (TPM) deployed within network device 120. This challenge/response protocol may be used to prevent "man-in-the-middle" attacks.

Upon receipt of this information and successful validation as the certificate may include the MAC and/or serial number of network device 120, where applicable, cloud-based service 110 provides provisioning information to network device 120 (operation 310). In general, the provisioning information is sufficient for network device 120 to establish communications with configuration device 130, namely particular server(s) for this embodiment, to acquire configuration setting information. According to one embodiment of the invention, the provisioning information may include (i) an Internet Protocol (IP) address of a particular server, (ii) keying information, and/or (iii) storage location information (e.g. organization name, division for the organization, folder or sub-folder name, etc.).

Thereafter, after network device 120 establishes communications with configuration device 130 and network device is verified, such as through use of a white list for example (operation 320), configuration device 130 is adapted to provide image and configuration setting information to network device 120 based on storage location information provided from network device 120. Hence, network device 120 is appropriately configured according to the configuration settings prescribed by the customer (operation 330). The configuration settings are used to control operability of network device 120. The configuration setting information may include security policy, Service Set Identifier (SSID), routing policy, shared secrets, transmit power levels, and/or wireless channels being utilized, etc.

Thereafter, network device 120 is loaded with the firmware image received from configuration device 130 and configured with the configuration rules and various policies prescribed by the customer for that particular network device. The network device 120 now is activated and operating on the WLAN and operating in a second operating state. Furthermore, as optional functionality, network device 120 may forward image and configuration information to other downstream network devices if network device 120 is designated as the virtual control device for a cluster of subordinate network devices (operation 340).

Although not shown, according to another embodiment of the invention, cloud-based service 110 may be adapted to provide provisioning information (e.g., IP address and/or DNS name for the server) to establish communications with configuration device 130 without pre-authentication of network device. According to this provisioning scheme, after network device 120 establishes communications (e.g., through a secure communication tunnel, such as an IPSec or GRE tunnel) with configuration device 130 (e.g. server), configuration device 130 may perform a validation check on the network device (e.g., determine that the MAC address of network device 120 is present on a white list supplied by the cloud-based service). Upon validation, configuration device 130 provides the configuration setting information to network device 120 as described above.

Now, featuring device and configuration setting information according to this embodiment, cloud-based service 110 is capable of organizing the information in accordance with various parameters such as firmware type, operating mode, original equipment manufacturer (OEM), device type or family, location (e.g., from Source IP address), cluster distribution, date of deployment, status (active, inactive), OS or boot block version number, and/or serial number.

Figure 4:
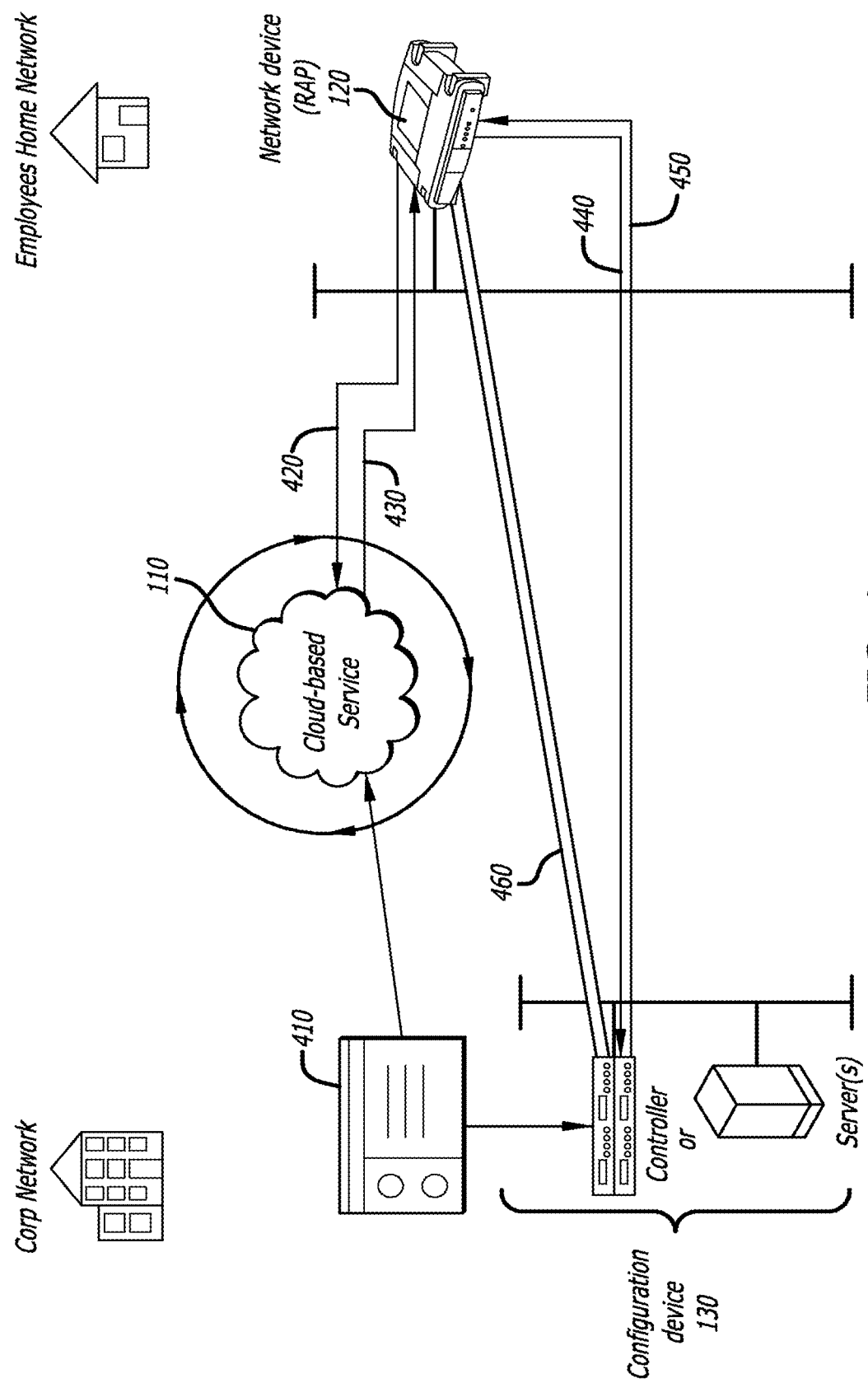
FIG. 4 is a second embodiment of the cloud-based, zero-touch provisioning scheme.

Referring now to FIG. 4, a second embodiment of the cloud-based, zero-touch provisioning scheme is shown for provisioning network device 120 in accordance with a second operating mode (e.g., as controller based AP "RAP")).

As shown, network device 120 is factory-shipped to its targeted destination such as an employee's home 400. At this point during product distribution, cloud-based service 110 already has access to Ethernet port information, serial number, and the organization associated with network device 120. Additionally, a current whitelist is uploaded into configuration device 130 (operation 410). This upload may be performed automatically in communications with cloud-based service 110 or may be downloaded by the customer and uploaded into configuration device 130.

The end user powers on network device 120 where, if network device 120 is configured with prescribed settings (e.g., factory default settings), network device 120 transmits device information to cloud-based service 110 (operation 420). As stated above, the device information may include (1) a Media Access Control (MAC) address for network device 120; (2) a serial number for network device 120; and/or (3) a device type or destination for network device 120.

Thereafter, validation of the network device may be optionally performed. Upon receipt of the device information and successful validation, where applicable, cloud-based service 110 provides provisioning information to network device 120 (operation 430). In general, the provisioning information is sufficient for network device 120 to establish communications with configuration device 130, namely at least one configuration device as shown. The provisioning information may include (i) an IP address for configuration device 130; and/or (ii) the DNS name for configuration device 130.

Thereafter, according to one embodiment as set forth in operation 440, using provisioning information and optionally its TPM stored digital certificate, network device 120 establishes secure communications with configuration device 130. This enables configuration device 130 to verify network device 120, such as comparison of the MAC address or serial number of the network device 120 with information within a white list (not shown), to determine configuration setting information and/or a firmware image for network device 120. Such configuration setting information is downloaded to network device 120 in order to set its configuration settings as prescribed by the customer (operation 450).

Thereafter, network device 120 is configured with the configuration rules and various policies prescribed by the customer for that particular network device. The network device 120 now is activated and operating on the WLAN. Furthermore, this allows network device 120 to establish an Internet Protocol Security (IPSec) tunnel 460 with configuration device 130.

Figure 5:
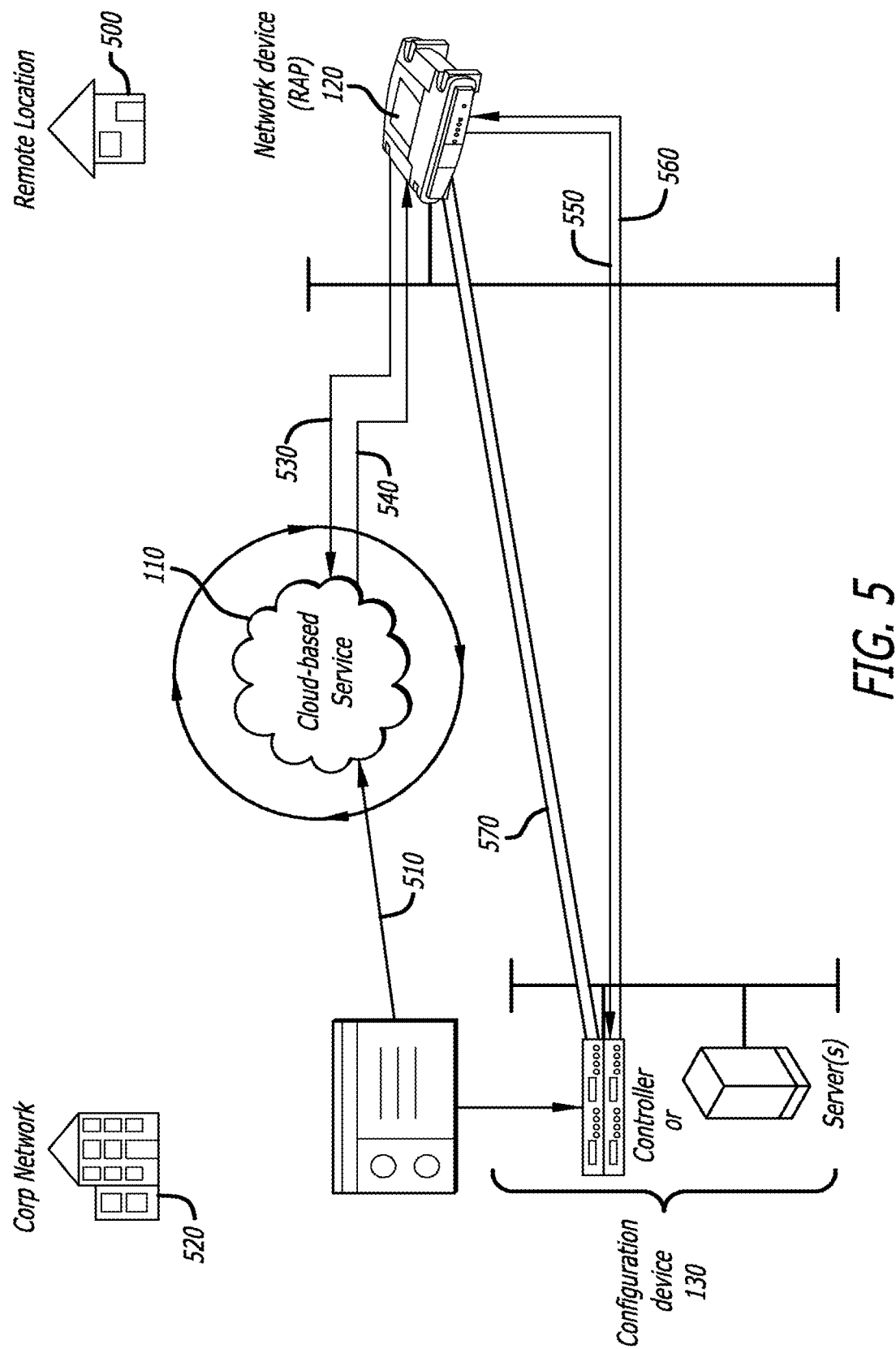
FIG. 5 is a third embodiment of the cloud-based, zero-touch provisioning scheme.

Referring now to FIG. 5, a third embodiment of the cloud-based, zero-touch provisioning scheme is shown in which network device 120 is provisioned from a first operating mode (e.g., IAP) to a second operating mode (e.g. RAP). This requires resetting network device 120 to the prescribed setting (e.g., factory default setting) and repositioning the device information within an appropriate folder assigned rules utilized by network devices operating in the second operating mode.

As shown, network device 120 is situated at its targeted destination 500. A current whitelist 510 is uploaded into configuration device 130 prior to provisioning. This upload may be performed automatically in communications with cloud-based service 110 or may be downloaded by the customer 520.

The end user powers on network device 120 (operation 520) where, if network device 120 has the prescribed setting, after a prescribed time has elapsed, network device 120 transmits device information to cloud-based service 110 (operation 530). The device information may include (1) a Media Access Control (MAC) address for network device 120; (2) a serial number for network device 120; and/or (3) a device type or destination for network device 120.

Thereafter, validation of the network device may be performed in communications with cloud-based service 110 in accordance with the challenge/response protocol and digital certificate as described above. Upon receipt of the device information and successful validation, if applicable, cloud-based service 110 provides provisioning information to network device 120 (operation 540). In general, the provisioning information is sufficient for network device 120 to establish communications with configuration device 130 (e.g., an IP address for configuration device 130 and/or the DNS name associated with configuration device 130, etc.).

Thereafter, according to one embodiment as set forth in operation 550, using provisioning information and optionally the TPM stored digital certificate, network device 120 establishes secure communications with configuration device 130. This enables configuration device 130 to provide the firmware image and configuration setting information to network device 120 in order to set its configuration settings as prescribed by the customer (operation 560).

Thereafter, network device 120 is configured with the configuration rules and various policies prescribed by the customer for that particular network device. The network device 120 now is activated and operating on the WLAN. Furthermore, this allows network device 120 to establish an Internet Protocol Security (IPSec) tunnel 570 with configuration device 130.

Note that, although only two operating mode (e.g., independent AP "IAP" and remote AP "RAP") are described in details here, the cloud-based service can support additional operating modes. For example, network device 120 being a controller or switch may be provisioned in accordance with the first embodiment for zero-provisioning while other types of access points relying on controller connectivity may be provisioned in accordance with the second embodiment for zero-provisioning.

Figures 6A, 6B:
FIG. 6A is an exemplary embodiment of a dashboard produced by the cloud-based service and accessible for rule modification.
FIG. 6B is an exemplary embodiment of a "Move to Folder" rule identified in the dashboard of FIG. 6A.

Referring to FIG. 6A, an exemplary embodiment of a dashboard 600 produced by the cloud-based service and accessible for rule modification is shown. Herein, folders are used to provide different provisioning based on different provisioning rules associated with different folders. For instance, as shown in dashboard 600, there are three folders named "default" 610, "iap" 612 and "rap" 614.

As shown, default folder 610 features two "Move to Folder" rules 620 and 622, identified as "mv.to.fld.cat.iap" 620 and "mv.to.fld.cat.rap" 622, which automatically move independent access points (IAP) to iap folder 612 and remote access points (RAP) to the rap folder 614, respectively. Details of mv.to.fld.cat.rap" 622 are shown in FIG. 6B.

Figures 6C, 6D, 6E:
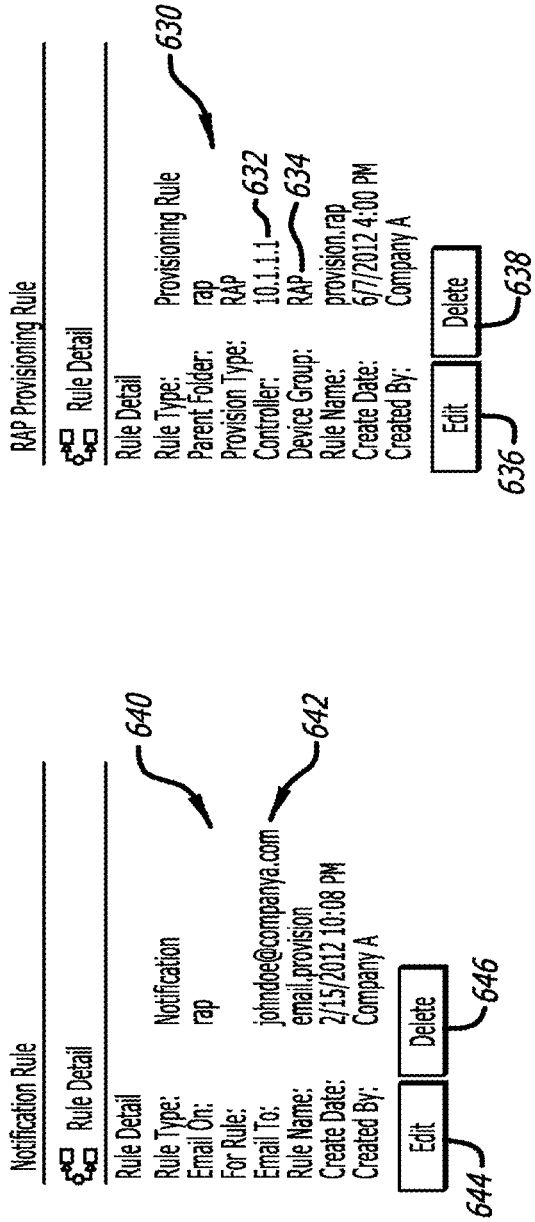
FIG. 6C is an exemplary embodiment of a dashboard associated with the rap folder set forth in the folder section of the dashboard of FIG. 6A.
FIG. 6D is an exemplary embodiment of a notification rule identified in the rap folder of FIG. 6C.
FIG. 6E is an exemplary embodiment of a RAP provisioning rule identified in the rap folder of FIG. 6C.
Figure 8A:
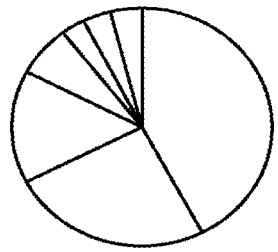
FIGS. 8A-8F are exemplary embodiments of dashboards produced by the cloud-based service and accessible for monitoring distribution of network devices.
Figure 8B:
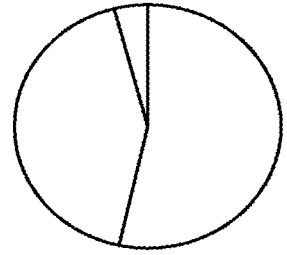
Figure 8C:
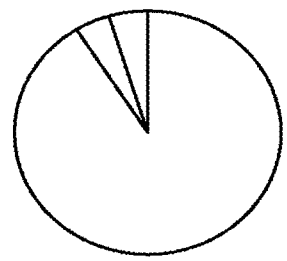
Figure 8D:
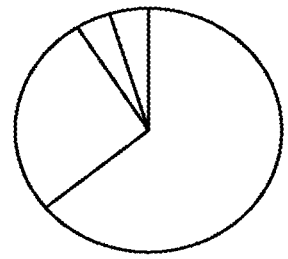
Figure 8E:
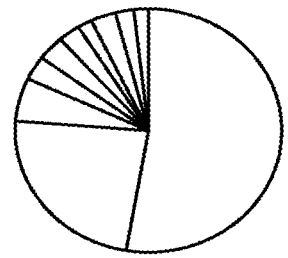
Figure 8F:
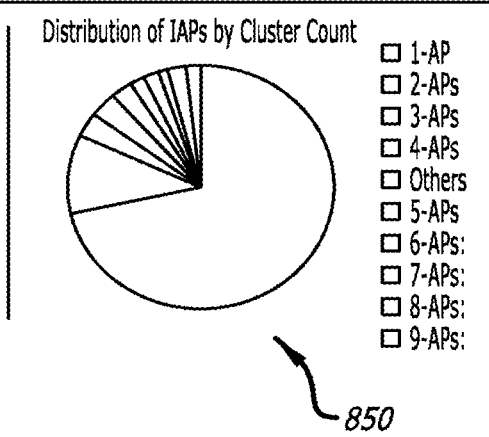

As shown in FIGS. 6C-6E, rap folder 614 features two rules, namely a RAP provisioning rule 630 and a notification rule 640. Notification rule 640 transmits an electronic message in response to a request for provisioning information by a network device seeking to operate in a particular operating mode (e.g. as a remote access point). Notification rule 640 includes a field 642 that identifies a recipient of the email along with Edit and Delete buttons 644 and 646 to modify the rule or delete the rule.

RAP provisioning rule 630 features controller IP address 632 (10.1.1.1) and device group 634 ("RAP"), which is information provided to a network device operating in the second operating mode (RAP) requesting provisioning information from the cloud-based service. It is contemplated that network device is set in the second operating mode when its device information is placed in RAP folder 614 or in Default folder 610, thereby relying on the "Move to Folder" rule 622. Edit and Delete buttons 636 and 638 are displayed to allow modification or deletion of the RAP provisioning rule 630.

Figure 7:
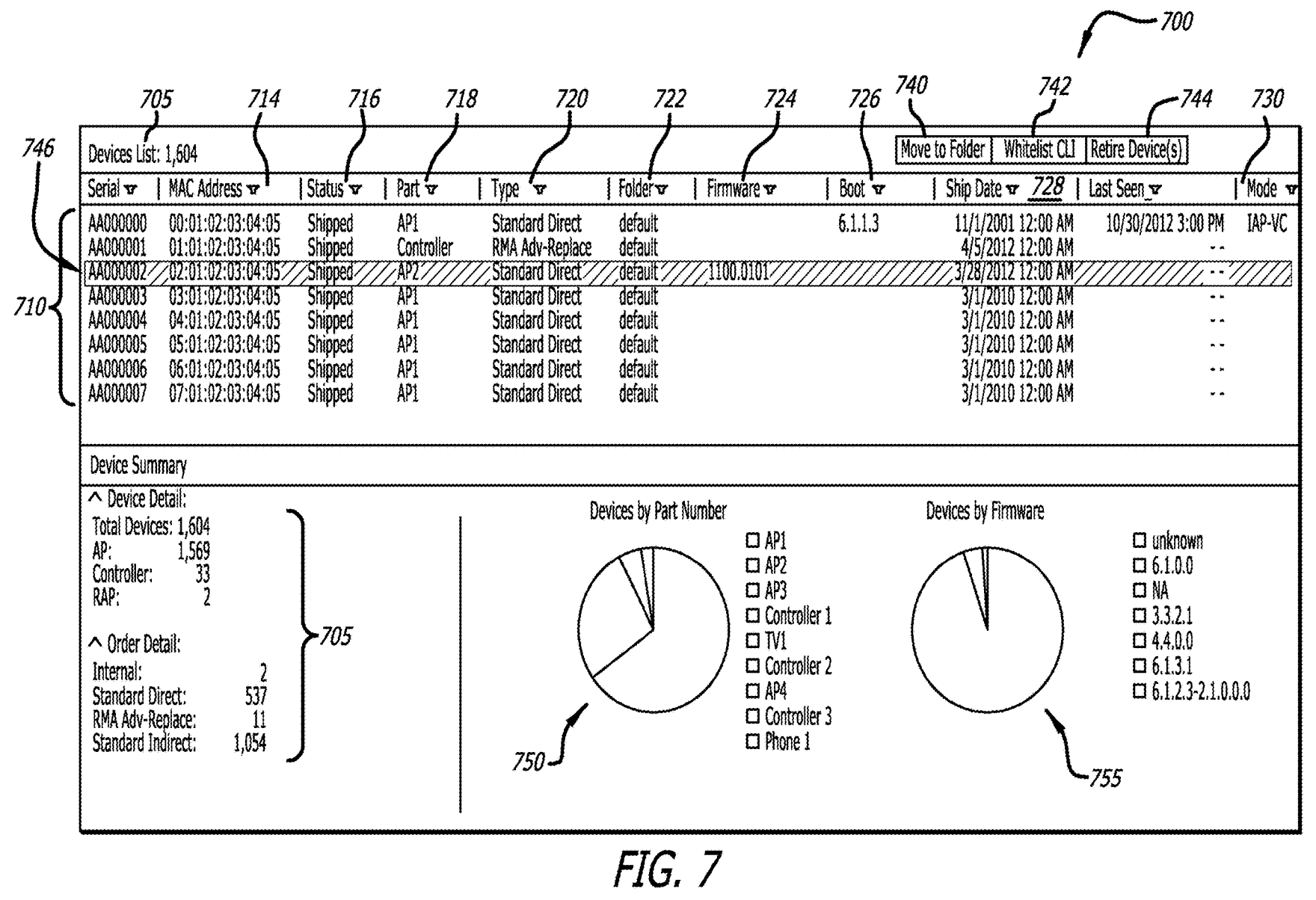

Referring to FIG. 7, an exemplary embodiment of a dashboard 700 produced by the cloud-based service and accessible by a customer and/or vendor for monitoring network devices orders and/or deployed within a network is shown. Herein, dashboard 700 comprises a total number of network devices 705 along with a plurality of entries 710, each including information associated with a particular network device. As shown, the information comprises a serial number 712, MAC addresses 714, status (manufactured, shipped, etc.) 716, part name 718, device type 720, folder 722 in which device information is stored (default, rap, iap), firmware version 724, boot block version 726, shipping date 728, and/or mode (i.e. whether virtual control device) 730.

Dashboard 700 further includes first action button 740 that is adapted to alter a folder assignment for a selected network entry when its corresponding entry is selected and the first action button is selected. For instance, upon selection of entry 746 and selecting first action button 740, a pop-up will provide the user with a selection as to which other folder (RAP, IAP) for placement of the information associated with this device. Dashboard 700 further includes second and third action buttons 742 and 744 for add or remove a selected network device from a whitelist and retire the network device, respectively.

Lastly, dashboard 700 comprises a device summary that features one or more graphical images displays a representation of the device information for all of the network devices. As an illustration, a representation of the network devices categorized by part number 750 and firmware type 755 is shown.

FIGS. 8A-8F represent different types of report dashboards 800, 810, 820, 830, 840 and 850 produced by the cloud-based service and accessible by a vendor and/or customer for monitoring distribution of network devices according to different parameters. For instance, report dashboard 800 identifies the distribution of network devices for a particular customer by firmware version. Dashboard 810-850 identifies the distribution of network devices for the particular customer by operating mode (IAP—virtual control device, IAP, RAP), OEM, part family, geography, and cluster count, etc.

Customers are configured to receive analytics and reports for their devices without having access to information associated with other customers.

The dashboard may optionally include a lifecycle column chart detailing for each device currently being manufactured including, e.g., devices in planned stage, devices in manufactured stage, devices that have contacted cloud-based service, devices that have been retired by customer, etc.

Also, the dashboard may optionally include a line chart detailing devices manufactured over a recent period, e.g., the past twelve months. Specifically, the line chart may display total year-to-date devices for month, for year, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as determined by the appended claims and their equivalents. The description is thus to be regarded as illustrative instead of limiting.

The invention claimed is:

1. A method comprising:
in response to a first event, automatically uploading device information from a first network device to a second network device providing a cloud-based service;
receiving, by the first network device and from the second network device, provisioning information for controlling an operation of the first network device responsive to uploading the device information;
provisioning the first network device based on the provisioning information;
establishing communication with a configuration device;
receiving configuration information for the first network device from the configuration device based on a validation check performed by the configuration device on the first network device using validation information provided by the second network device; and
upon validation via a trusted platform module deployed within the first network device, configuring the first network device based on the received configuration information.

2. The method of claim 1, wherein the provisioning information comprises at least two of (1) a Media Access Control (MAC) address for the first network device, (2) a serial number for the first network device, and (3) storage location information, the method further comprising:
using the provisioning information to obtain configuration information for the first network device.

3. The method of claim 1, wherein the received configuration information comprises at least one of: a security policy, a wireless service set identifier (SSD), a routing policy, shared secret information, wireless transmission power information, or wireless channels.

4. The method of claim 1, further comprising:
pushing the information for controlling operation of the first network device onto a third network device that is associated with a same subnetwork as the first network device.

5. The method of claim 1, wherein the first event includes performing an initial power up placing the first network device in a first operating state and connecting to a network associated with the second network device.

6. The method of claim 1, wherein the configuration information is obtained by the first network device (i) using at least a portion of the provisioning information received from the second network device to establish communications with a third network device, (ii) providing information identifying the first network device, and (iii) receiving the configuration information based on the information identifying the first network device.

7. The method of claim 1, further comprising:
uploading the device information and receiving the information controlling the operation of the first network device using digital certificates.

8. The method of claim 1, wherein the validation comprises performing validation using a challenge and response protocol soliciting a signed certificate from the trusted platform module.

9. A first network device comprising a processor resource, and configured to:
in response to a first event, automatically upload device information to a second network device that provides a cloud-based service;
receive from the second network device, provisioning information for controlling an operation of the first network device responsive to uploading the device information;
provision the first network device based on the provisioning information;
establish communication with a configuration device to obtain configuration information for the first network device;
receive the configuration information for the first network device from the configuration device based on a validation check performed by the configuration device on the first network device using validation information provided by the second network device; and
upon validation via a trusted platform module deployed within the first network device, configure the first network device based on the received configuration.

10. The first network device of claim 9, wherein the provisioning information comprises at least two of (1) a Media Access Control (MAC) address for the first network device, (2) a serial number for the first network device, and (3) storage location information,
wherein the first network device further to: use the provisioning information to obtain configuration for the first network device.

11. The first network device of claim 9, wherein the received configuration information comprises at least one of: a security policy, a wireless service set identifier (SSD), a routing policy, shared secret information, wireless transmission power information, or wireless channels.

12. The first network device of claim 9, the first network device further to:
push the information for controlling operation of the first network device onto a third network device that is associated with a same subnetwork as the first network device.

13. The first network device of claim 9, wherein the validation is performed using a challenge and response protocol resulting in the first network device sending a signed certificate in response to a solicitation of the signed certificate from the trusted platform module.

14. A non-transitory storage medium including software that, when executed by one or more hardware processors implemented within a first network device, performs operations comprising:
in response to a first event, automatically uploading device information from the first network device to a second network device that provides a cloud-based service;
receiving, from the second network device, provisioning information for controlling the operation of the first network device responsive to uploading the device information;

provisioning the first network device based on the provisioning information;

establishing communication with a configuration device to obtain configuration information for the first network device;

receiving the configuration information for the first network device from the configuration device based on a validation check performed by the configuration device on the first network device using validation information provided by the second network device; and upon validation via a trusted platform module deployed within the first network device, configuring the first network device based on the received configuration.

15. The non-transitory storage medium of claim 14, further comprising instructions that, when executed, cause the processor to perform operations comprising using the provisioning information to obtain configuration for the first network device, wherein the provisioning information comprises at least two of (1) a Media Access Control (MAC) address for the first network device, (2) a serial number for the first network device, and (3) storage location information.

16. The non-transitory storage medium of claim 14, wherein the received configuration information comprises at least one of: a security policy, a wireless service set identifier (SSD), a routing policy, shared secret information, wireless transmission power information, or wireless channels.

17. The non-transitory storage medium of claim 14, wherein the software that, when executed by the one or more hardware processors implemented within the first network device, performs operations further comprising receiving a solicitation requesting a signed certificate from the trusted platform module, and responding with the signed certificate.

* * * * *